United States Patent [19]

Feightner et al.

[11] Patent Number: 5,214,567
[45] Date of Patent: May 25, 1993

[54] MODULAR PERIPHERAL PLATFORM HAVING TWO DISK DRIVES AND ONE ELECTRICAL CONNECTOR

[75] Inventors: Rick Feightner, West Linn; Jim Williams, Forest Grove, both of Oreg.

[73] Assignee: Intel Corporation, Santa Clara, Calif.

[21] Appl. No.: 810,694

[22] Filed: Dec. 19, 1991

[51] Int. Cl.⁵ .......................... H05K 7/10; H05K 7/14
[52] U.S. Cl. ..................................... 361/393; 361/391
[58] Field of Search ............... 364/708; 361/380, 390, 361/391, 392, 394, 395, 399; 439/502, 505, 638, 652

[56] References Cited

U.S. PATENT DOCUMENTS

| | | | |
|---|---|---|---|
| 3,011,098 | 11/1961 | Godley | 361/391 |
| 4,894,792 | 1/1990 | Mitchell et al. | 364/708 |
| 4,926,291 | 5/1990 | Sarraf | 361/392 X |
| 4,941,841 | 7/1990 | Darden et al. | 361/380 |
| 5,136,466 | 8/1992 | Remise et al. | 361/391 |
| 5,136,468 | 8/1992 | Wong et al. | 361/393 |

FOREIGN PATENT DOCUMENTS

| | | | |
|---|---|---|---|
| 63-209966 | 8/1988 | Japan | 361/380 |
| 805175 | 12/1958 | United Kingdom | 361/390 |

OTHER PUBLICATIONS

IBM Technical Disclosure Bulletin, vol. 28, No. 8, Jan., 1986, pp. 3409-3411, "Cartridge Latch System".
IBM Technical Disclosure Bulletin, vol. 28, No. 9, Feb. 1986, pp. 3877 and 3878, "Diskette Drive Single Connector, Low Power Interface".
IBM Technical Disclosure Bulletin, vol. 29, No. 8, Jan., 1987, pp. 3692-3693, "Tray Assembly for Mounting Interchangeable Electromagnetic Devices".
IBM Technical Disclosure Bulletin, vol. 30, No. 3, Aug., 1987, pp. 1253-1255, "Personal Computer Structure Designed for Robatized Manufacturability".
IBM Technical Disclosure Bulletin, vol. 34, No. 6, Dec. 1991, pp. 279-281, "Expansion Unit for Back-Mounted Computer System".

Primary Examiner—Leo P. Picard
Assistant Examiner—Michael W. Phillips
Attorney, Agent, or Firm—Blakely, Sokoloff, Taylor & Zafman

[57] ABSTRACT

A computer subassembly that includes a pair of disk drives each attached to an end of a module. The module has a printed circuit board that couples the disk drives to a single connector extending from the subassembly. The connector can be plugged into a mating connector within the computer, which provides power and allows the transmission of digital signals between the disk drives and the computer. The disk drives can be electrically and structurally coupled to the computer by merely plugging the module connector into the computer connector.

9 Claims, 2 Drawing Sheets

MODULAR PERIPHERAL PLATFORM HAVING TWO DISK DRIVES AND ONE ELECTRICAL CONNECTOR

BACKGROUND OF THE INVENTION

1. Field of the Invention

The present invention relates to a computer subassembly that allows disk drives to be plugged into a computer.

2. Description of Related Art

Desktop computers are typically constructed with a motherboard, which can receive a plurality of electronic cards that may contain memory or logic devices. The motherboard allows the cards to communicate with each other during the operation of the computer. Most desktop computers contain a hard disk drive that provides a large amount of memory. Desktops also typically have a floppy disk drive that can read and write floppy disk which are inserted into the computer. Most disk drives are installed by screwing the units into the computer chassis, and then coupling the drives to the rest of the computer through connectors and wire harnesses.

Having a plurality of connectors within the computer chassis can lead to confusion and error in the installation of the disk drives. Additionally, the wire harnesses tend to occupy valuable space, sometimes making it difficult to insert other electronic cards. The probability of error increases when the disk drives are changed or installed by the end user, who tends to be less knowledgeable about computers. It would therefore be desirable to have a means for easily installing and detaching the disk drives of a computer.

SUMMARY OF THE INVENTION

The present invention is a computer subassembly that includes a pair of disk drives each attached to an end of a module. The module has a printed circuit board that couples the disk drives to a single connector extending from the subassembly. The connector can be plugged into a mating connector within the computer, which provides power and allows the transmission of digital signals between the disk drives and the computer. The disk drives can be electrically and structurally coupled to the computer by merely plugging the module connector into the computer connector.

Therefore it is an object of this invention to provide a module that allows at least two disk drives to be coupled to a computer through one connector.

It is also an object of this invention to provide a module that allows a disk drive to be connected to a computer without any fasteners.

It is also an object of this invention to provide a device that allows the disk drives of a computer to be easily replaced.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
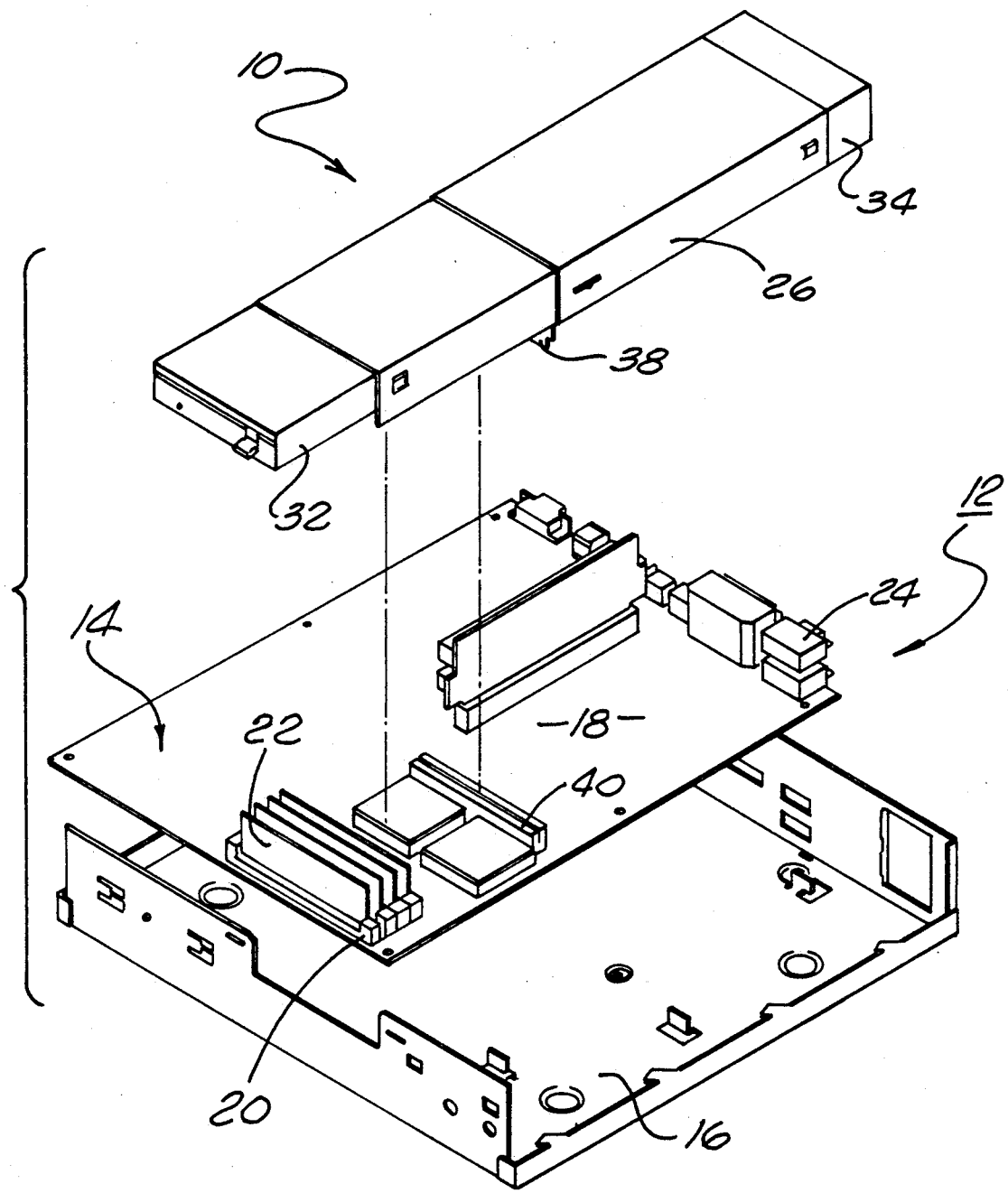
FIG. 1 is a perspective view of a subassembly of the present invention separated from a computer, the subassembly having a pair of disk drives connected to a module.

Referring to the drawings more particularly by reference numbers, FIG. 1 shows a subassembly 10 of the present invention. The subassembly 10 can be installed into a computer 12. The computer 12 usually has a motherboard 14 mounted onto a chassis 16. The motherboard 14 is typically a printed circuit board 18 that has a plurality of card connectors 20 extending from one surface of the board. The card connectors 20 allow electronic cards 22, which typically contain memory and logic devices, to be plugged into the motherboard 14. The motherboard 14 has internal routing that allows the cards 22 to communicate with each other as is known in the art. The motherboard 14 may also have peripheral connectors 24 to allow the computer to be coupled to peripheral devices such as a keyboard or printer.

Figure 2:
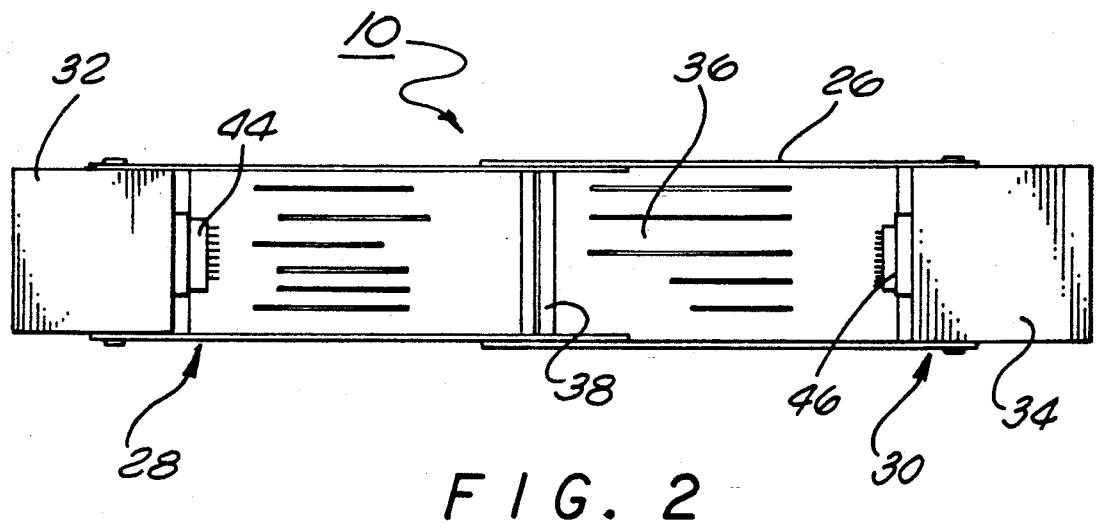
FIG. 2 is a bottom view of the subassembly of FIG. 1.

As shown in FIG. 2, the subassembly 10 has a module 26 with a first end 28 and a second opposite end 30. Attached to the first end 28 is a first disk drive 32. The first disk drive 32 is typically a floppy drive adapted to extend from the front of the computer 12, so that a user can insert a floppy disk into the drive. Attached to the second end 30 is a second disk drive 34. The second disk drive 34 is typically a hard disk, which is enclosed within the computer 12. The module 26 also has a printed circuit board 36 that couples the disk drives 32 and 34, to a first connector 38. The first connector 38 is adapted to be plugged into and coupled with a motherboard connector 40. The connectors 38 and 40, allow power to be supplied from a power supply (not shown) to the disk drives. The connectors also allow signal lines to be transmitted between the drives and the computer 12. The connectors 38 and 40, may be card edge, pin and socket, or any other type of connector, that allows easy insertion and disengagement of the module 26 from the motherboard 14.

The subassembly 10 does not require fasteners or tools for installation. The connectors both structurally and electrically couple the subassembly 10 to the computer 12. The present invention thus allows the disk drives of a computer to be inserted and detached in one motion. Such a device decreases the time needed to repair or test disk drives within a computer. In the preferred embodiment, the manufacturer of the module would provide a variety of subassemblies having different types and sizes of disk drives, that can be installed and changed to create different computer systems. Although two disk drives are shown, it is to be understood that the subassembly 10 can be used with only one disk drive attached to an end of the module 26. The module 26 may be constructed from a metal or a metal coated plastic to provide electromagnetic interference (EMI) protection for the printed circuit board 36.

Figure 3:
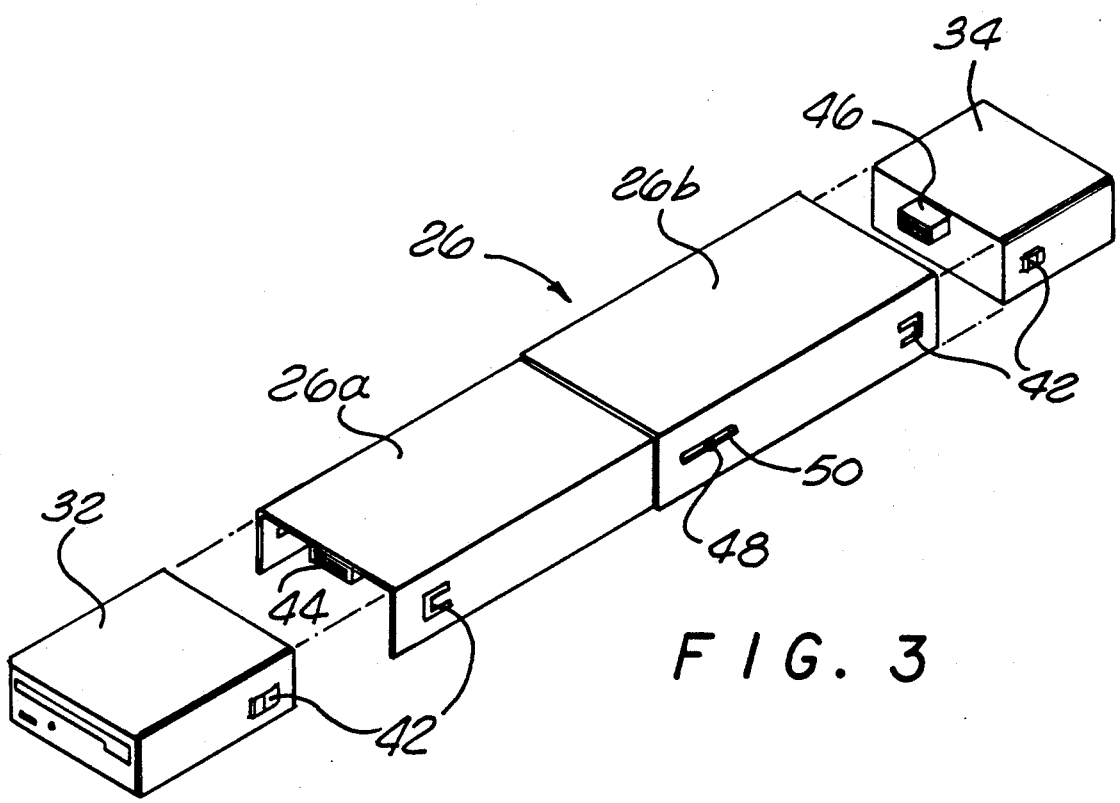
FIG. 3 is an exploded view of the subassembly of FIG. 1 showing the disk drives detached from the module.

FIG. 3 shows a preferred embodiment of the subassembly 10, wherein the disk can be separated from the module 26. The subassembly 10 may have fasteners 42 that mechanically couple the drives to the module and allow for easy insertion and detachment of the drives. The first drive 32 can be connected to the printed circuit board 36 by a second electrical connector 44. The second drive 34 can be connected to the circuit board 36 by a third electrical connector 46. The connectors provide means to electrically connect and decouple the disk from the module. The module may be constructed from two separate pieces 26a and 26b, which are attached by screws 48 that extend through slots 50. Module piece 26b may be wider than piece 26a, such that the pieces can slide over each other, thereby allowing the user to adjust the length of the module 26. By adjusting the module length, the subassembly 10 can be used in computer systems having various widths.

While certain exemplary embodiments have been shown and described in the above description and accompanying drawings, it is to be understood that such embodiments are merely illustrative of, and not restrictive on the broad invention, and that this invention not be limited to the specific constructions and arrangements shown and described, since various other modifications may occur to those ordinarily skilled in the art.

What is claimed is:

1. A computer subassembly adapted to be coupled to a computer having a motherboard connector, comprising:
   a module;
   a first disk drive attached to said module;
   a second disk drive attached to said module;
   a first connector attached to said module and adapted to be coupled to the motherboard connector; and,
   circuit means attached to said module to electrically couple said first and second disk drives to said first connector.

2. The computer subassembly as recited in claim 1, wherein said first disk drive is detachably connected to said module.

3. The computer subassembly as recited in claim 1, wherein said circuit means is a printed circuit board.

4. The computer subassembly as recited in claim 1, wherein said module is constructed to protect said circuit means from electromagnetic interference.

5. A computer subassembly adapted to be coupled to a computer having a motherboard connector, comprising:
   a module having a first end and a second end;
   a first disk drive detachably connected to said first end of said module;
   a second disk drive detachably connected to said second end of said module;
   a first connector attached to said module and adapted to be coupled to the motherboard connector; and,
   a printed circuit board attached to said module, said printed circuit board electrically coupling said first and second disk drives to said first connector.

6. The computer subassembly as recited in claim 5, wherein said first disk drive is coupled to said printed circuit board by a second connector and said second disk drive is coupled to said printed circuit board by a third connector.

7. The computer subassembly as recited in claim 6, wherein said first connector transmits power to said first and second disk drives, and allows transmission of digital signals between said first and second disk drives and the computer.

8. The computer subassembly as recited in claim 7, wherein said module is constructed to protect said printed circuit board from electromagnetic interference.

9. A method of installing a disk drive into a computer, comprising the steps of:
   providing a computer with a motherboard connector;
   providing a subassembly that has a first disk drive attached to one end of a module and a second disk drive attached to an opposite end of said module, said module having a first connector that is electrically coupled to said disk drives, said first connector being constructed to be plugged into said motherboard connector; and,
   plugging said first connector into said mother board connector such that said subassembly is structurally and electrically coupled to said computer.

* * * * *